United States Patent
Tachikawa

(10) Patent No.: US 7,039,427 B2
(45) Date of Patent: May 2, 2006

(54) PRIVATE INFORMATION SUPPLYING SYSTEM FOR MOBILE STATIONS, METHOD FOR DISPLAYING PRIVATE INFORMATION AND METHOD FOR ROUGHLY POSITIONING USERS

(75) Inventor: Takashi Tachikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 605 days.

(21) Appl. No.: 10/154,855

(22) Filed: May 28, 2002

(65) Prior Publication Data

US 2002/0183052 A1 Dec. 5, 2002

(30) Foreign Application Priority Data

May 29, 2001 (JP) ............................. 2001-161487

(51) Int. Cl.
*H04Q 7/20* (2006.01)
(52) U.S. Cl. .................... 455/457; 455/404.2; 455/422; 455/459; 455/456; 455/426; 455/414.2; 455/410; 455/411; 455/432.3; 455/407; 455/408; 455/414.4
(58) Field of Classification Search ............... 455/422, 455/459, 458, 456, 426, 414.02, 404.2, 410, 455/411, 432.3, 407, 408, 414.1
See application file for complete search history.

(56) References Cited

U.S. PATENT DOCUMENTS

| | | | |
|---|---|---|---|
| 5,923,294 A * | 7/1999 | Bacelon et al. .............. | 342/457 |
| 6,317,605 B1 * | 11/2001 | Sakuma ....................... | 455/457 |
| 6,587,691 B1 * | 7/2003 | Granstam et al. ........... | 455/457 |
| 2002/0137523 A1 * | 9/2002 | Diggelen ..................... | 455/456 |
| 2002/0147008 A1 * | 10/2002 | Kallio ......................... | 455/426 |

FOREIGN PATENT DOCUMENTS

JP 2000-331284 11/2000

* cited by examiner

*Primary Examiner*—Joseph Feild
*Assistant Examiner*—David Q. Nguyen
(74) *Attorney, Agent, or Firm*—Foley & Lardner LLP

(57) ABSTRACT

A private information supplying system is established in a mobile telephone network, and the mobile stations are assumed to be at the positions of base stations presently communicating; an information service center produces a piece of relative position between users on the basis of the current positions, and transmits the piece of relative position when the user permits the other user to acquire it; the private information supplying system does not require any assistance of the GPS so that the system is economical and does not disturb the privacy.

21 Claims, 12 Drawing Sheets

PRIVATE INFORMATION SUPPLYING SYSTEM FOR MOBILE STATIONS, METHOD FOR DISPLAYING PRIVATE INFORMATION AND METHOD FOR ROUGHLY POSITIONING USERS

FIELD OF THE INVENTION

This invention relates to a private information service technology and, more particularly, to a private information supplying system for informing users of current status and relative positions defined by a distance, a compass bearing and a moving direction among their mobile stations, a method for displaying the private information and a method for roughly positioning the mobile stations.

DESCRIPTION OF THE RELATED ART

A typical example of the private information supplying system for mobile stations is disclosed in Japanese Patent Application laid-open No. 2000-331284. The prior art private information supplying system disclosed therein offers the positioning service to automobiles of a certain group. The automobiles carry navigation systems, respectively, and the navigation systems are respectively associated with mobile stations such as cellular phones. The navigation systems receive radio waves from the GPS (Global Positioning System) satellites, and determine the current positions of the automobiles. The mobile stations transmit data signals representative of the current positions of the automobiles through the communication system to one another, and the navigation systems display the current positions of the other automobiles on the screen of the navigation system carried on each automobile.

Although the prior art private information supplying system exactly informs the user in each automobile of the current positions of the other automobiles, the users respectively require the navigation systems for positioning the automobiles through the global positioning system, i.e., GPS, and the GPS receiver makes the user's terminal bulky. This is the first problem inherent in the prior art positioning system.

Another problem inherent in the prior art private information supplying system disturbs user's privacy, because the global positioning system precisely gives the current position of a user to the other users. Users, who want to guard the privacy, tend to refuse the prior art private information supplying system, and the prior art private information supplying system can not get good demand.

SUMMARY OF THE INVENTION

It is therefore an important object of the present invention to provide a private information supplying system, which is compact and less disturbs user's privacy.

It is another important object of the present invention to provide a method for displaying private information without disturbance of privacy in real-time fashion.

It is also an important object of the present invention to provide a method for positioning users without any assistance of a huge positioning system such as the GPS.

In accordance with one aspect of the present invention, there is provided a private information supplying system for supplying a piece of private information of a first user to a second user, and the private information supplying system comprising plural base stations assigned areas, respectively, plural mobile stations movable in the areas and outside of the areas and having respective display panels for producing visual images representative of at least first sub-pieces of private information each indicative of a relative position between the first user and the second user, each of the plural mobile stations communicating with one of the plural base stations while the aforesaid each of the plural mobile stations is moving in the area assigned to the aforesaid one of the plural base stations and an information service center communicable through the plural base stations with the plural mobile stations, producing each of the first sub-pieces of private information of the first user on the basis of current positions determined through communication between the mobile stations of the first and second users and the base stations communicating therewith when the second user request the information service center to supply the aforesaid each of the first sub-pieces of private information and transmitting the aforesaid each of the first sub-pieces of private information through the associated base station to one of the mobile stations of the second user if the first user permits the second user to access the aforesaid each of the first sub-pieces of private information.

In accordance with another aspect of the present invention, there is provided a method for producing visual images representative of a piece of private information having at least a first sub-piece of private information indicative of a relative position between a first user and a second user, and the method comprises the steps of a) transmitting a request for supplying the piece of private information from a mobile station of the first user through a first base station to an information service center together with a first piece of current private data information representative of at least a current position of the first user determined through communication between the first mobile station and the first base station, b) producing the aforesaid at least a first sub-piece of private information on the basis of the first piece of current private data information and a second piece of current private data information representative of at least a current position of the second user determined through communication between a second mobile station of the second user and a second base station, c) transmitting the piece of private information having the first sub-piece of private information from the information service center through the first base station to the first mobile station and d) producing the visual images on a display panel of the first mobile station.

In accordance with yet another aspect of the present invention, there is provided a method for positioning a user on a mobile station comprising the steps of a) specifying a base station assigned an area in which the mobile station is, and b) determining a current position of the mobile station on the assumption that the mobile station is at a certain sub-area in the area.

In accordance with still another aspect of the present invention, there is provided a private information supplying system for supplying a piece of private information of a first user to a second user, and the private information supplying system comprising plural base stations assigned areas, respectively, plural mobile stations movable in the areas and outside of the areas and having respective display panels for producing visual images representative of at least first sub-pieces of private information each indicative of a position of the first user, each of the plural mobile stations communicating with one of the plural base stations while the aforesaid each of the plural mobile stations is moving in the area assigned to the aforesaid one of the plural base stations, an information producing means associated with the plural mobile stations and producing each of the first sub-pieces of private information of the first user on the basis of a current position determined through communication between the mobile station of the first user and the base station communicating therewith when the second user request the information producing means to produce the aforesaid each of the first sub-piece of private information and an information transmitting and receiving means associated with the plural mobile stations and the information producing means and supplying the aforesaid each of the first sub-pieces of private information to one of the mobile stations of the second user if the first user permits the second user to access the aforesaid each of the first sub-pieces of private information.

BRIEF DESCRIPTION OF THE DRAWINGS

The features and advantages of the private information supplying system, the method for displaying private information and the method for positioning users will be more clearly understood from the following description taken in conjunction with the accompanying drawings, in which FIG. 13 is a schematic view showing the system configuration of yet another private information supplying system.

DESCRIPTION OF THE PREFERRED EMBODIMENTS

First Embodiment

System Configuration

Figure 1:
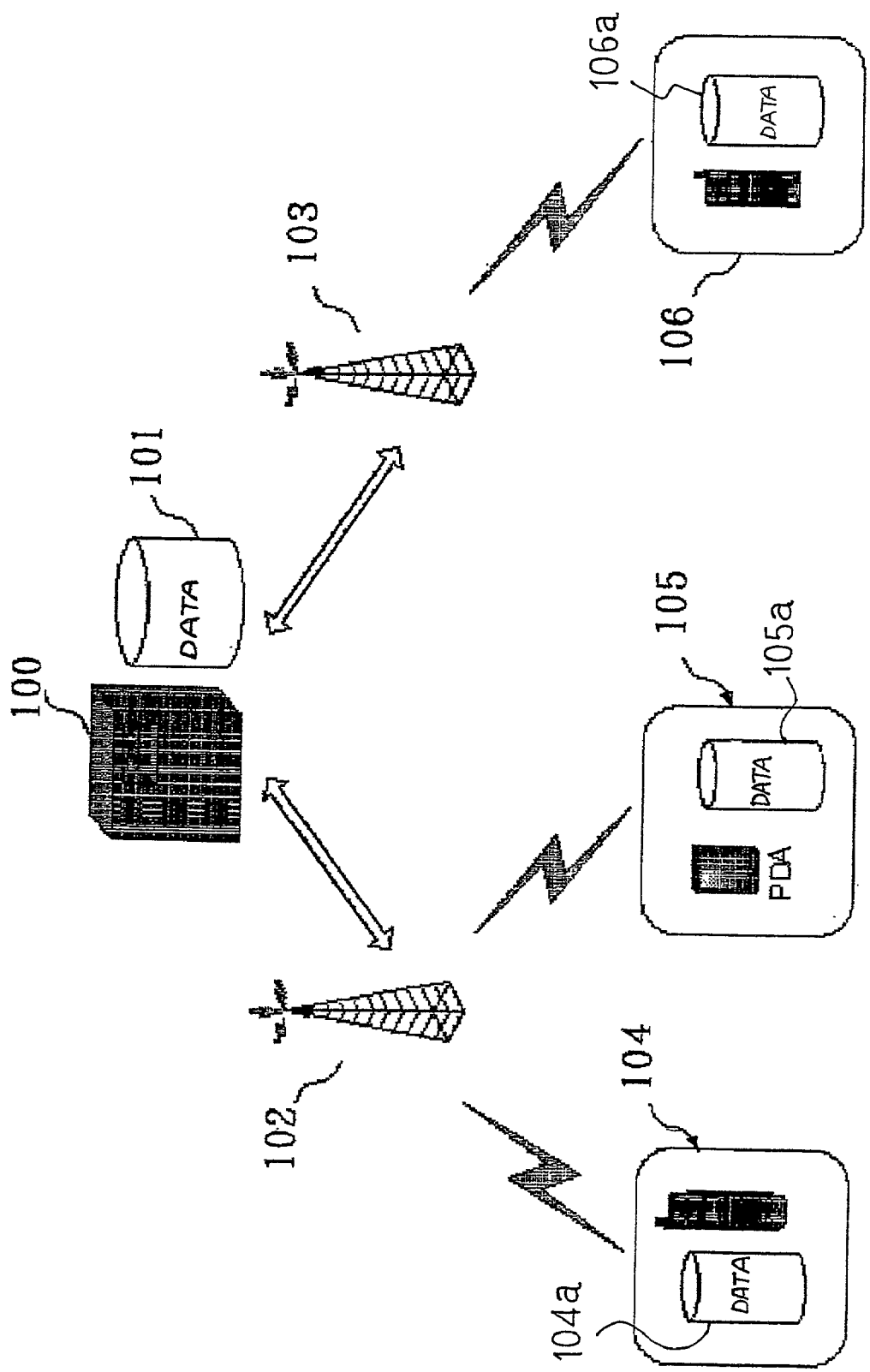
FIG. 1 is a schematic view showing the system configuration of a private information supplying system according to the present invention.

Referring to FIG. 1 of the drawings, a private information supplying system embodying the present invention comprises an information service center 100, plural base stations 102/103 and plural mobile stations 104/105/106. Although only two base stations 102/103 are shown in FIG. 1, more than two base stations are incorporated in the private information supplying system.

The plural base stations 102/103 are assigned areas A/B, respectively. The mobile stations in the area A are communicable with the base station 102 through radio channels, and the mobile stations in the area B are communicable with the base station 103 through radio channels. Pieces of current private data information are transmitted from the mobile stations 104/105/106 to the base stations 102/103 through the radio channels, and the base stations 102/103 transfer the pieces of current private data information through cables to the information service center 100.

The information service center determines a piece of relative positional data information between users and a piece of current status data information for each of the users of the mobile stations 104/105/106, and transmits the piece of relative positional data information and the piece of current status data information through the base station 102/103 to a mobile station 104/105/106 if the mobile station 104/105/106 has been already permitted to access.

The mobile stations 104/105/106 are movable in the areas A/B, and are moved from the area A to the area B, from the area A/B to unassigned area, which has not been assigned to any base station, and from the unassigned area to the area A/B. Various sorts of mobile stations form parts of the private information supplying system. In this instance, the mobile stations 104/106 are mobile telephones, and the mobile station 105 is a personal digital assistant.

The mobile stations 104/105/106 have data memories 104a/105a/10a, respectively, and the pieces of current private data information are stored in the data memories 104a/105a/10a, respectively. In case where a user has permitted another user to access the piece of current private data information, the mobile station automatically transmits the piece of current private data information to the information service center 100 when the information service center 100, base station 102/103 or another user requests the mobile station to transmit it. Namely, the mobile stations 104/105/106 transmit the pieces of current private data information to the information service center 100 on demand without any manipulation by the user. When a user wants to know the relative position to another user, the user manipulates the mobile station 104/105/106 so as to request the information service center 100 to send a piece of relative positional data information. The mobile station 104/105/106 concurrently sends the piece of current private data information through the base station 102/103 to the information service center 100. The pieces of relative positional data information and the pieces of current status data information are distributed from the information service center 100 to the base stations 102/103, and are selectively transmitted from the base stations 102/103 to the mobile stations 104/105/106.

The mobile stations 104/105/106 further have respective display panels. When a mobile station 104/105/106 receives pieces of relative positional data information and pieces of current status data information from other mobile stations 105/106, 106/104 or 104/105, the mobile station 104/105/106 stores the pieces of relative positional data information and the pieces of current status data information in the memory 104a/105a/10a, and produces visual images of symbols, letters and numerals representative of the pieces of relative positional data information and the pieces of current status data information on the display panel.

The information service center 100 has a data storage facility 101, and the pieces of current private data information are accumulated in the data storage facility 101. The information service center 100 edits and processes the pieces of current private data information, and produces private records 101 for the mobile stations 104/105/106, respectively. The user for whom a certain private record 101 has been edited is hereinbelow referred to as "owner user", and other users who do not own the certain private record 101 are referred to as "other users".

Figure 2:
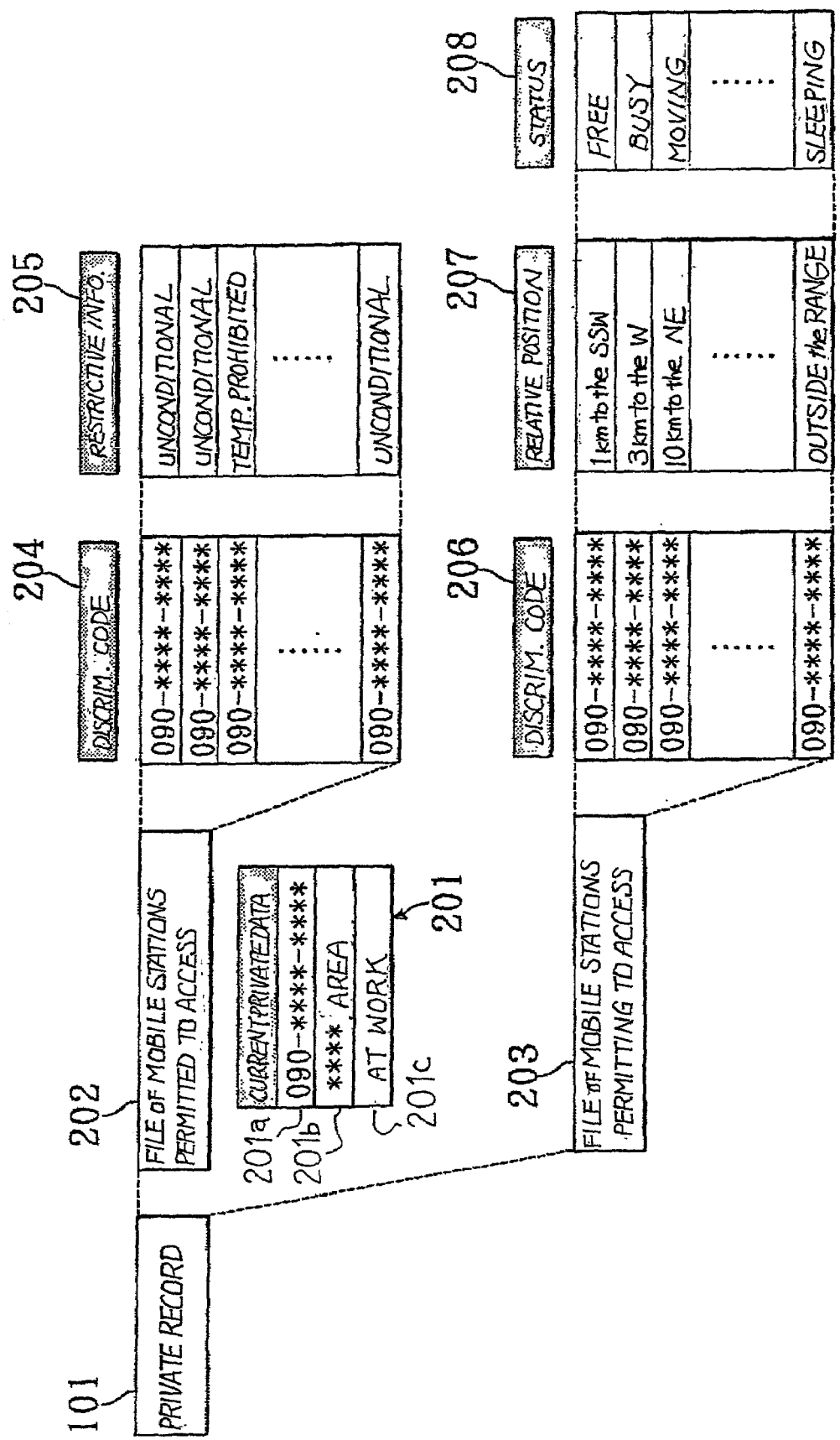
FIG. 2 is a view showing a private record and a piece of current private data information.

FIG. 2 illustrates a piece of current private data information 201 and one of the private records stored in the data storage facility 101. The piece of current private data information is stored in the private record together with two files. The piece of current private data information 201 includes several sub-pieces of current private data information 201. The piece of current private data information 201 is assumed to describe the owner user of the private record 101 shown in FIG. 2.

The first sub-piece 201a of current private data information is representative of a discriminative code assigned to the mobile station 104/105/106. In other words, the owner of the mobile station assigned the discriminative code owns the piece of current private data information 201. In this instance, the telephone number "090-**-**" assigned to the mobile telephone serves as the discriminative code.

The second sub-piece 201b of current private data information is representative of a current position where the mobile station 104/105/106 is. The term "current position" does not mean a pinpoint precisely decided through the global positioning system. The current position is as wide as the area assigned to a base station, or is equivalent to a sub-area in the area assigned to the base station. Several methods for positioning mobile stations will be described hereinafter in detail. In this instance, the current position teaches that the mobile station 104/105/106 is in the area assigned to the base station ****.

The third sub-piece 201c of current private data information is representative of the current status of the owner user such as, for example, at work, free, busy, moving, sleeping and so forth. In this instance, the third sub-piece 201 of current private data information indicates that the owner user is at work.

The file of mobile stations permitted to access includes at least two data blocks 204 and 205. The first data block 204 is assigned to the mobile stations which have already acquired the permission to access the piece of current private data information by the owner user. The mobile stations permitted to access are registered with the discriminative codes assigned thereto. For this reason, the telephone numbers "090-**-", "090--", "090--", . . . "090--**" are written in the block 204. The second data block 205 is linked with the first block 204, and stores pieces of restrictive information representative of a condition of permission. Although the owner user has permitted another owner to access the piece of current private data information, the permission may be conditional. If the permission is unconditional, the piece of restrictive information is representative of "unconditional", and the owner is permitted always to access the piece of current private data information. The owner user may temporarily prohibit another user from accessing the piece of current private data information. If so, the piece of restrictive information is representative of "temporarily prohibited". In this instance, the owner in the third row of the first data block 204 is presently prohibited from accessing the piece of current private data information.

The file of mobile stations permitting to access includes at least three data blocks 206, 207 and 208. The first data block 206 is assigned to the mobile stations, the other users of which have already permitted the owner user to access the pieces of current private data information. The other users permitting the owner user to access are also registered with the discriminative codes assigned thereto. For this reason, the telephone numbers "090-**-", "090--", "090--", . . . "090--**" are written in the block 206. The second block 207 is linked with the first block 206, and stores pieces of relative positional data information between the other users and the owner user. The relative position is expressed by using the compass bearing and distance therebetween. In this instance, the other owner in the first row of the first block 206 is 1 kilometers to the south-southwest of the owner user, the other owner in the second row is 3 kilometers to the west of the owner user, the other owner in the third row is 10 kilometers of the owner user, and the other owner in the last row is outside of the range. The third block 208 is also linked with the first and second blocks 206/207, and stores the pieces of current status data information representative of the current status of the other users. In this instance, the other owner in the first row of the first block 206 is presently free, the other owner in the second row is presently busy, the other owner in the third row is presently moving, and the other owner in the last row is now sleeping. When the information service center 100 can not determine the relative position between the owner user and another user, the information service center 100 gives the piece of current status data information representative of "outside of the range" to another user.

The files 202 and 203 and other data blocks may be maintained in the mobile station in such a manner that the user freely adds new mobile stations to or deletes some mobile stations from the files. In this instance, the information service center 100 duplicates the contents of the files 202/203 maintained in each mobile station, and checks the files before supplying pieces of private information.

System Behavior

Description is made on a data acquisition sequence on the assumption that the owner user of the mobile station 104 requests the information service center 100 to send a piece of relative positional data information to the mobile station 106 and a piece of current status data information of the user who carries the mobile station 106.

When the owner user wants to acquire the piece of relative positional data information and the piece of current status data information, the owner user instructs the mobile station 104 to transmit the piece of current private data information 201 and the discriminative code assigned to the mobile station 106 through a radio channel to the base station 102. The mobile station 104 requests the base station 102 to establish a radio channel. When a radio channel is established between the mobile station 104 and the base station 102, the mobile station 104 transmits the piece of current private data information 201 and the discriminative code to the base station 102. The base station 102 transfers the piece of current private data information 201 and the discriminative code to the information service center 100.

The base station 102 accesses the private record 101 of the owner user, and checks the file of mobile stations permitting to access 203 to see whether or not the other user, who carries the mobile station 106, presently permits the owner user to acquire the piece of relative positional data information and the piece of current status data information. When the other user permits the owner user to access the piece of current private data information, the information service center 100 processes the pieces of current private data information so as to produce a piece of relative positional data information. The information service center 100 further accesses the third block 208, and fetches the piece of current status data information representative of the current status of the other user. The information service center 100 transmits the piece of relative positional data information and the piece of current status data information through the base station 102 to the mobile station 104. The piece of relative positional data information and the piece of current status data information are stored in the data memory 104a, and visual images representative of the piece of relative positional data information and the piece of current status data information are produced on the display panel of the mobile station 104.

On the other hand, if the other user prohibits the owner user from accessing, the information service center 100 produces a piece of message data representative of the refusal, and transmits the piece of message data through the base station 102 to the mobile station 104. Visual images representative of the refusal are produced on the display panel of the mobile station 104.

Figure 3:
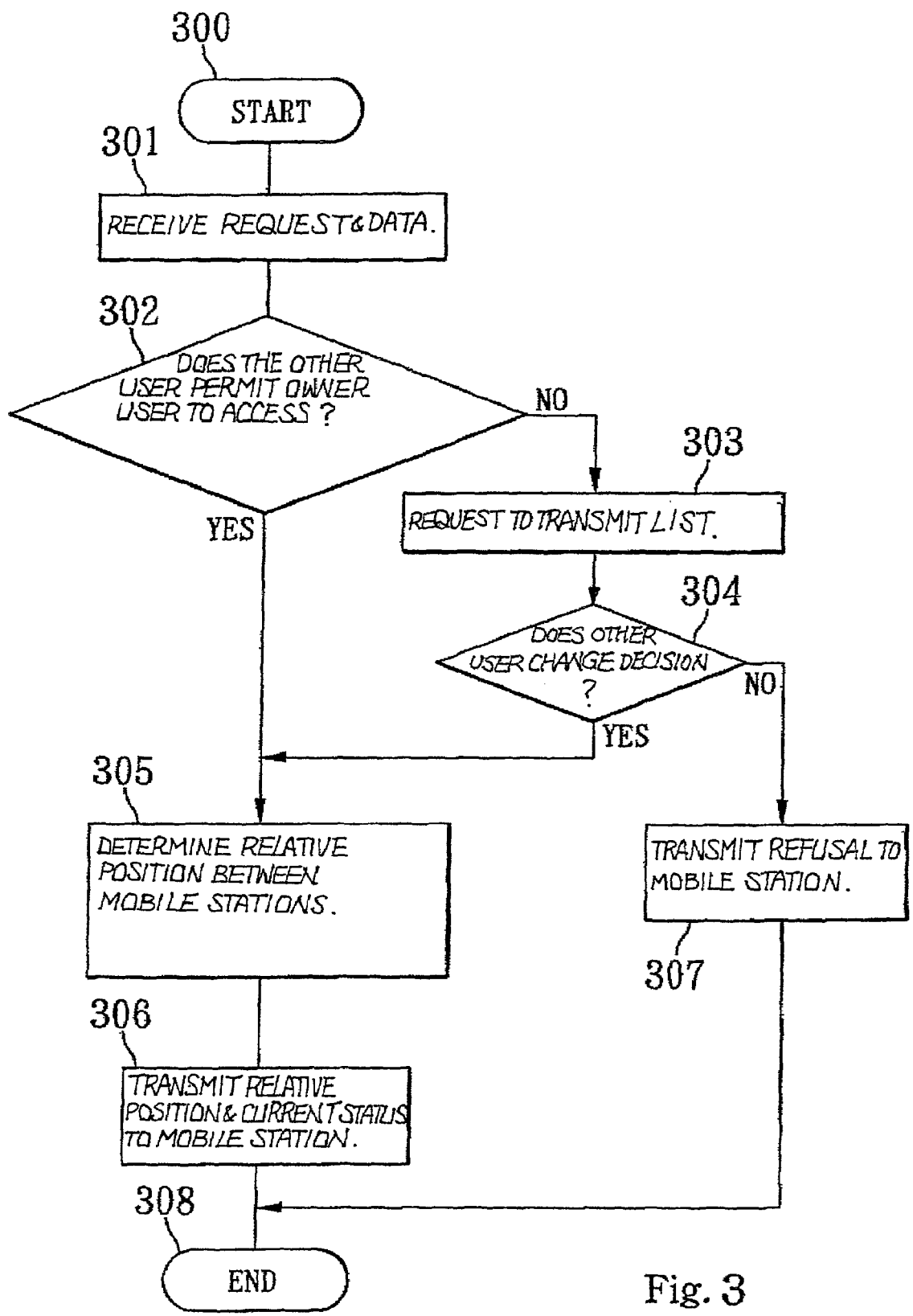
FIG. 3 is a flowchart showing a system behavior of the private information supplying system according to the present invention.

FIG. 3 illustrates the system behavior of the private information supplying system according to the present invention. When the owner user instructs the mobile station 104 to acquire a piece of relative positional data information between the mobile stations 104 and 106, the private information supplying system starts the control sequence shown in FIG. 3. The mobile station 104 transmits the piece of current private data information 201, the discriminative code assigned to the mobile station 106, a list of other users permitted to access his or her own current private data information and the pieces of restrictive information through the base station 102 to the information service center 100. The other users in the list and the conditions are stored in the file of mobile stations permitted to access 202.

The request reaches the information service center 100, and the piece of current private data information and the discriminative code are received by the information service center as by step 301. The information service center 100 checks the files of mobile stations permitting to access 203 to see whether or not the other user of the mobile station 106 permits the owner user to access as by step 302. Otherwise, the information service center 100 directly checks the file of mobile stations permitted to access 202 of the private record assigned to the mobile station 106 to see whether or not the other user has already permitted the owner user to access.

When the information service center 100 does not find the discriminative code assigned to the mobile station 104 in the file 203, the answer at step 302 is given negative, and the information service center 100 transmits a request for transmitting the list of permitted users through the base station 103 to the mobile station 106 so as to confirm the refusal as by step 303, because the other user may have changed the decision. Upon reception of the request, the mobile station 106 transmits the list of permitted users through the base station 103 to the information service center 100. The information service center 100 checks the list of permitted users to see whether or not the other user has changed the decision from the refusal to permission as by step 304.

When the other user permits the owner user to access, the answer at step 304 is given affirmative, and the information service center 100 proceeds to step 305. If the information service center 100 finds the discriminative code assigned to the mobile station 106 in the file 203, the information service center 100 directly proceeds to step 305 without the execution at steps 303 and 304.

The information service center 100 carries out a data processing on the second sub-pieces of current private data information 201b representative of the current positions at which the mobile stations are, and produces a piece of relative positional data information as by step 305. The piece of relative positional data information is stored in the second block 207. The piece of relative positional data information is transmitted from the information service center 100 through the base station 102 to the mobile station 104 together with the piece of current status data information representative of the current status of the other user as by step 306.

The pieces of relative positional data information and the piece of current status data information are stored in the data memory 104a, and visual images representative of the piece of relative positional data information and the piece of current status data information are produced on the display panel of the mobile station 104. In this instance, the piece of relative positional data information and the piece of current status data information as a whole constitute a piece of private information.

However, if the information service center 100 does not find the discriminative code assigned to the mobile station 104 in the list just arrived, the answer at step 304 is given negative, again. Then, the information service center 100 transmits the message representative of the refusal through the base station 102 to the mobile station 104 as by step 307. The message is stored in the data memory 104a, and the visual images representative of the message are produced on the display panel of the mobile station 104.

After step 306 or 307, the private information supplying system terminates the sequence at step 308.

In the above-described system behavior, the owner user specifies other user with the discriminative code assigned thereto. However, the owner user may request the information service center 100 to transmit all the pieces of private information stored in the file of mobile stations permitting to access 203 to his or her mobile station without specifying the discriminative codes.

Visual Images on Display Panel

Assuming now that the owner user transmits the piece of current private data information 201 and several discriminative codes assigned to other users, the information service center 100 carries out the above-described sequence, and transmits the pieces of private information to the owner user's mobile station. The mobile station of the owner user has the list where the discriminative codes assigned to other users whose private information is required so that the discriminative codes are immediately transmitted to the information service center 100. When the mobile station receives the pieces of private information, the mobile station produces visual images representative of the pieces of private information on the display panel. The visual images to be produced on the display panel are described in detail.

First Example

Figure 4:
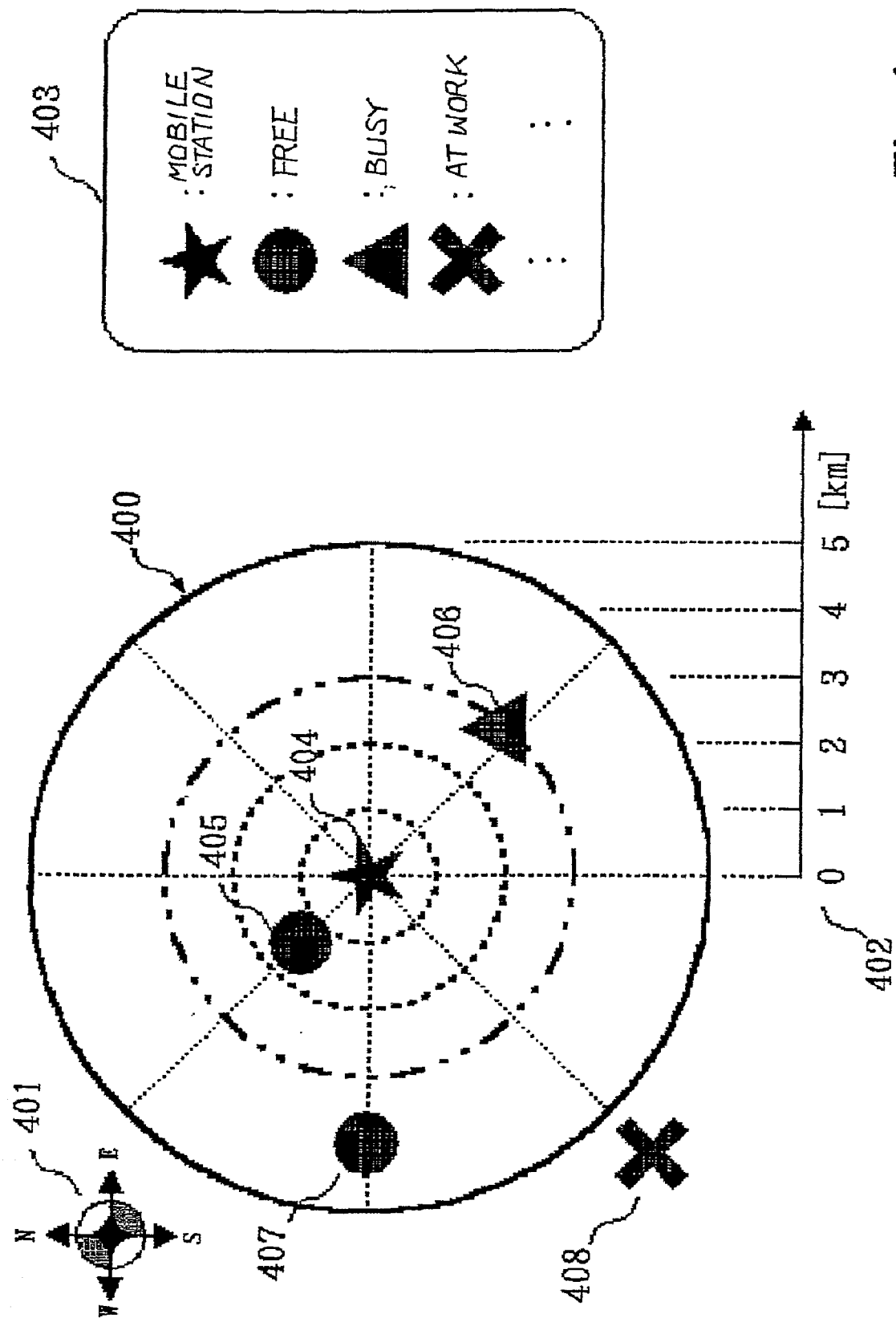
FIG. 4 is a view showing visual images produced on a display panel of a mobile station.

FIG. 4 shows visual images 400, 401, 402, 403, 404, 405, 406, 407 and 408 produced on a display panel. Concentric circles 400 are associated with a compass 401 and a scale mark 402. The compass 401 is indicative of the bearings such as the north N, south S, east E and west W with respect to the center of the concentric circles, and the scale mark 402 gives the distance from the center to the respective concentric circles 400. The visual image 403 is a list of graphical symbols 404, 405, 406, 407 and 408; the star is indicative of the mobile station of the owner user, the black circle is indicative of another user who is presently free, the black triangle is indicative of another user who is presently busy, and mark X is indicative of another user who is presently at work. The owner user arbitrarily defines the graphical symbols.

When pieces of relative positional data information and pieces of current status data information reach the mobile station 104, the mobile station 104 produces the concentric circles 400, compass 401 and scale mark 402 on the display panel, and plots the owner user's mobile station 104 and the other users by using appropriate graphical symbols 404 to 408. The owner user's mobile station 104 is always at the center of the concentric circles 400, and the relative positions between the owner user and the other users 405 to 408 are represented by the distance between the center and the graphical symbols 405 to 408 and the angle corresponding to the bearings on the compass 401. In this instance, it is understood from the visual images on the display panel that the mobile stations represented by the black circles 405 and 407 are free and 1.5 kilometers to the northwest and about 4 kilometers to the west of the owner user. The user represented by the black triangle 406 is busy and 3 kilometers to the southeast of the owner user. The user represented by mark X is at work and more than 5 kilometers of the southwest of the owner user.

Second Example

Figure 5:
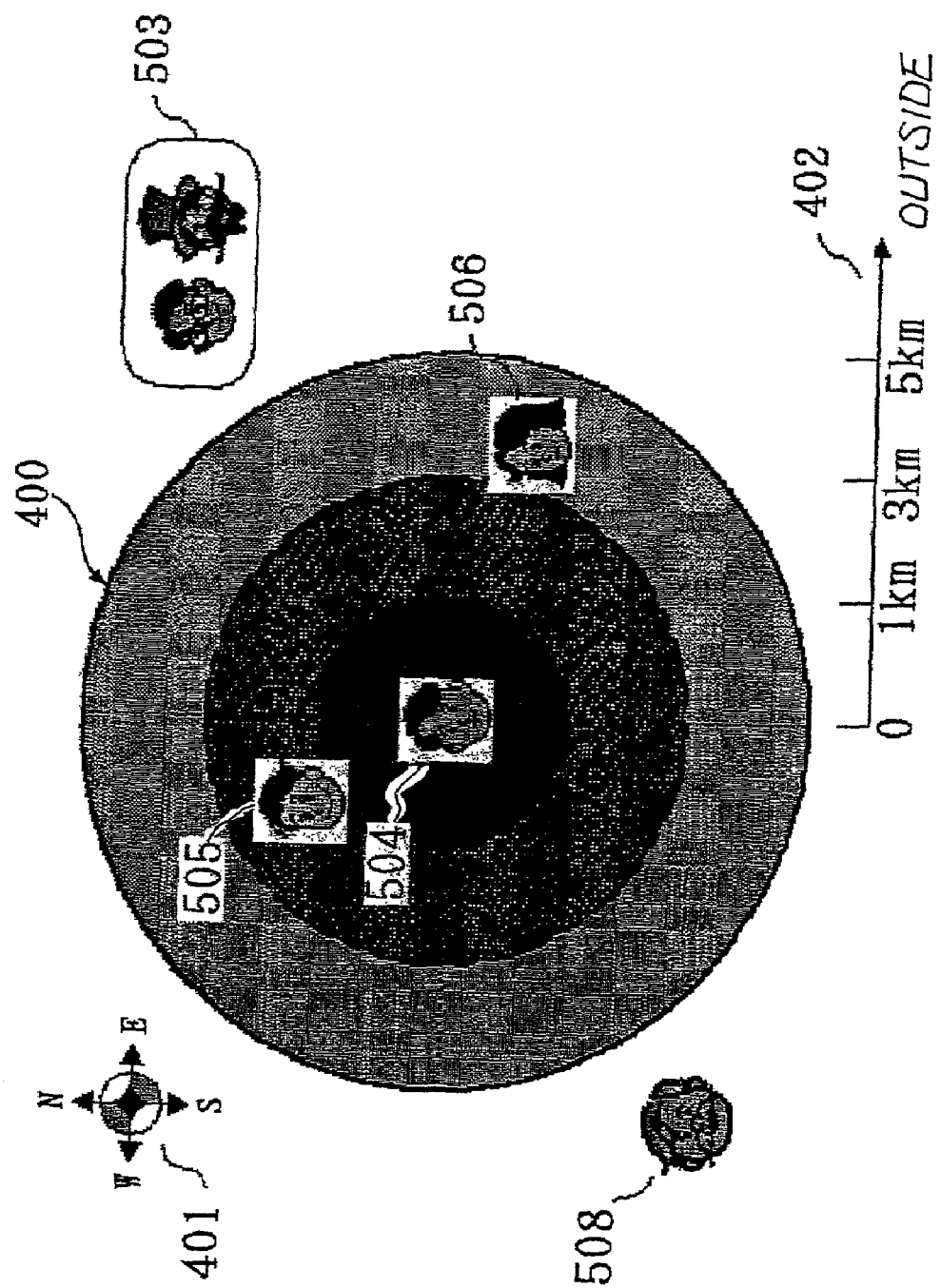
FIG. 5 is a view showing visual images produced on a display panel of another mobile station.

FIG. 5 shows visual images 503, 504, 505, 506 and 508 together with the visual images 400, 401 and 403. The visual images 400, 401 and 402 are same as those produced on the display panel shown in FIG. 4. The visual image 503 is a rectangular area, and the visual images 504, 505, 506 and 508 are face-photographs of users. Portraits and character symbol marks are available for the users. The users in the rectangular area are presently suspended or turn off their mobile stations.

The owner user 504 is at the center of the concentric circles 400, and the relative positions between the owner user and the other users 505/506 are determinable from the distance between the face-photographs and the angle corresponding to the bearings on the compass 401. However, the user 508 is outside of the outermost concentric circle. The face-photograph 508 merely teaches that the user 508 is outside of the range, the boundary of which is 5 kilometers apart from the owner user 504.

Third Example

Figure 6:
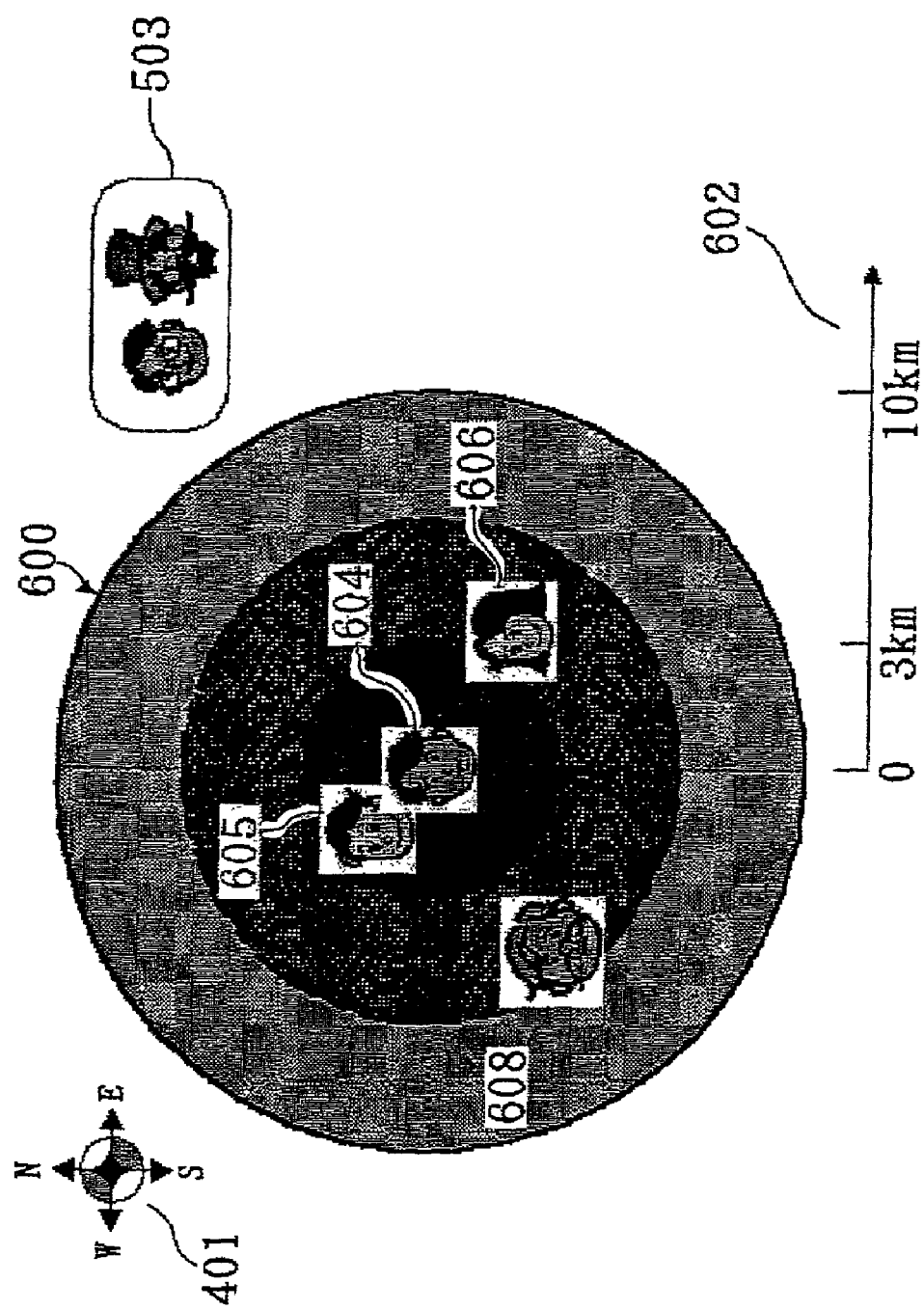
FIG. 6 is a view showing visual images produced on a display panel of yet another mobile station.

FIG. 6 illustrates visual images 600, 602, 604, 605, 606 and 608 together with the visual images 401 and 503. The visual images 401 and 503 are same as those on the display panel shown in FIG. 5. Although the concentric circles 400 and scale mark 402 fixedly indicate the range from zero to 5 kilometers, the concentric circles 600 and scale mark 602 are expandable. It is understood from the visual images shown in FIG. 5 that the user 508 is outside of the range, the boundary of which is kilometers apart from the owner user. However, the owner user may want to determine the relative position between the owner user and the user 508 more specifically. In this situation, the owner user instructs the mobile station 104 to change the scale mark. The mobile station replaces the visual images 400 and 402 with the visual images 600 and 602. The outermost concentric circle is indicative of the boundary 10 kilometers spaced apart from the owner user 604. Not only other users 605/606 but also the user 608 are within the concentric circles 600. The owner user can determine the relative position of the user 608 on the display panel.

Fourth Example

Figure 7:
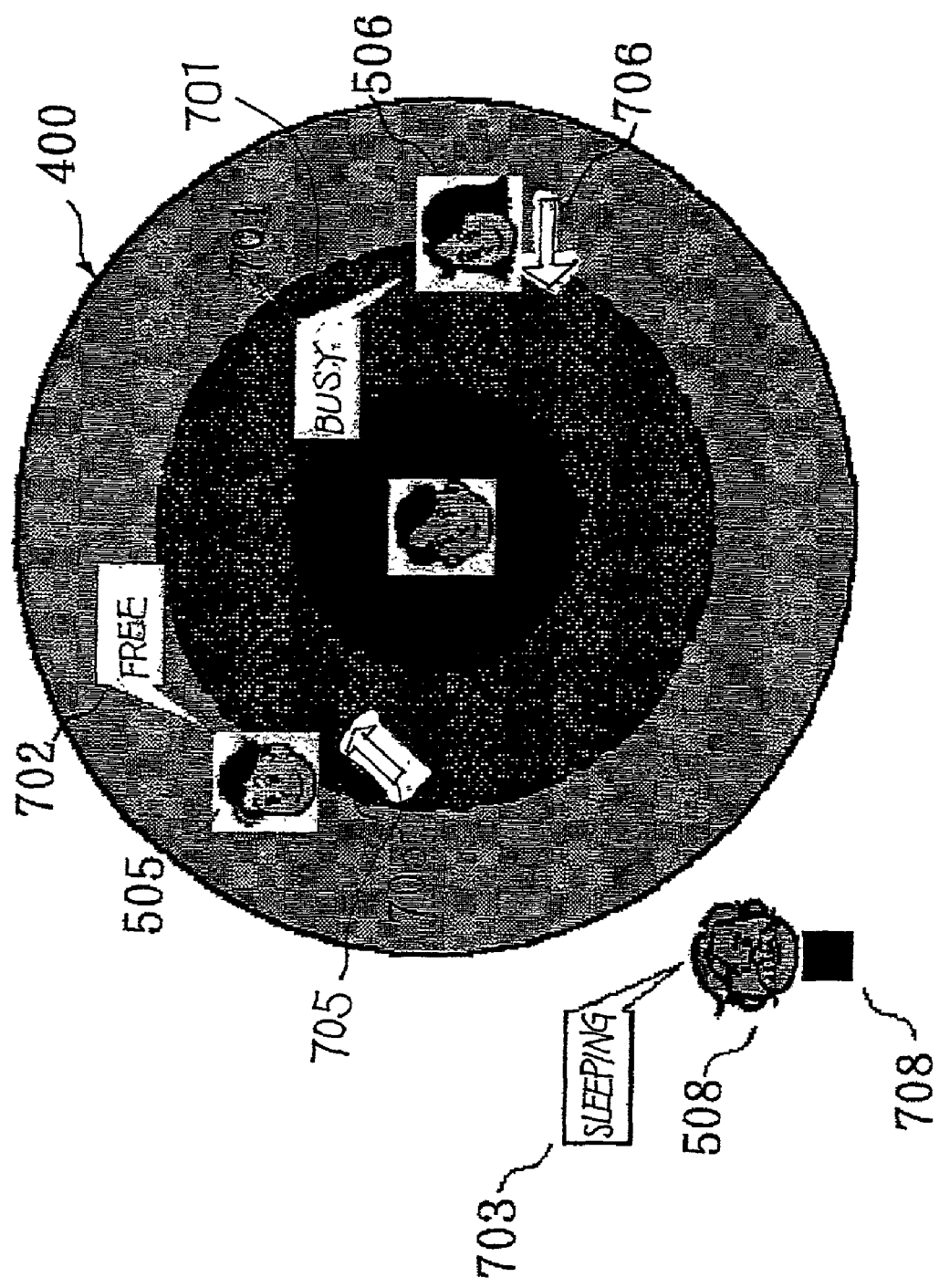
FIG. 7 is a view showing visual images produced on a display panel of still another mobile station.

FIG. 7 illustrates visual images 701, 702, 703, 705, 706 and 708 together with the visual images 400, 505, 506 and 508. The visual images 400, 505, 506 and 508 are same as those on the display panel shown in FIG. 5. The visual images 701, 702 and 703 are corresponding to alphabetical letters "BUSY", "FREE" and "SLEEPING", and are indicative of the current status of the users 505/506 and 508. The visual images 505 and 506 are arrows, which indicates moving directions of the users 505/506. The arrow 505 is directed to 45 degrees inclined from the up-and-down direction in clockwise direction, and indicates that the user 505 is moving to the northeast of the owner user. On the other hand the arrow 506 is directed to the left, and indicates that the user 506 is moving to the west of the owner user. The visual image 708 is a black square. The black square 708 indicates that the user 508 stays there.

The private information supplying system determines the moving direction on the basis of a series of relative positions stored in the memory 101. In detail, when the piece of current private data information reaches the information service center 100, the information service center 100 accumulates the second sub-piece of current private data information 201b in the private record 101 assigned to the user. When another user requests the information service center 100 to send the piece of relative positional data information, the information service center 100 analyzes the series of second sub-pieces of current private data information accumulated in the private record 101 so as to determine the moving direction. If the series of second sub-pieces of current private data information are indicative of a certain area, the information service center 100 determines that the user stays there. When the information service center 100 completes the analysis, the information service center 100 transmits the piece of relative positional data information representative of the relative position and the moving direction through the base station 102/103 to the owner user's mobile station together with the piece of current status data information.

Fifth Example

Figure 8:
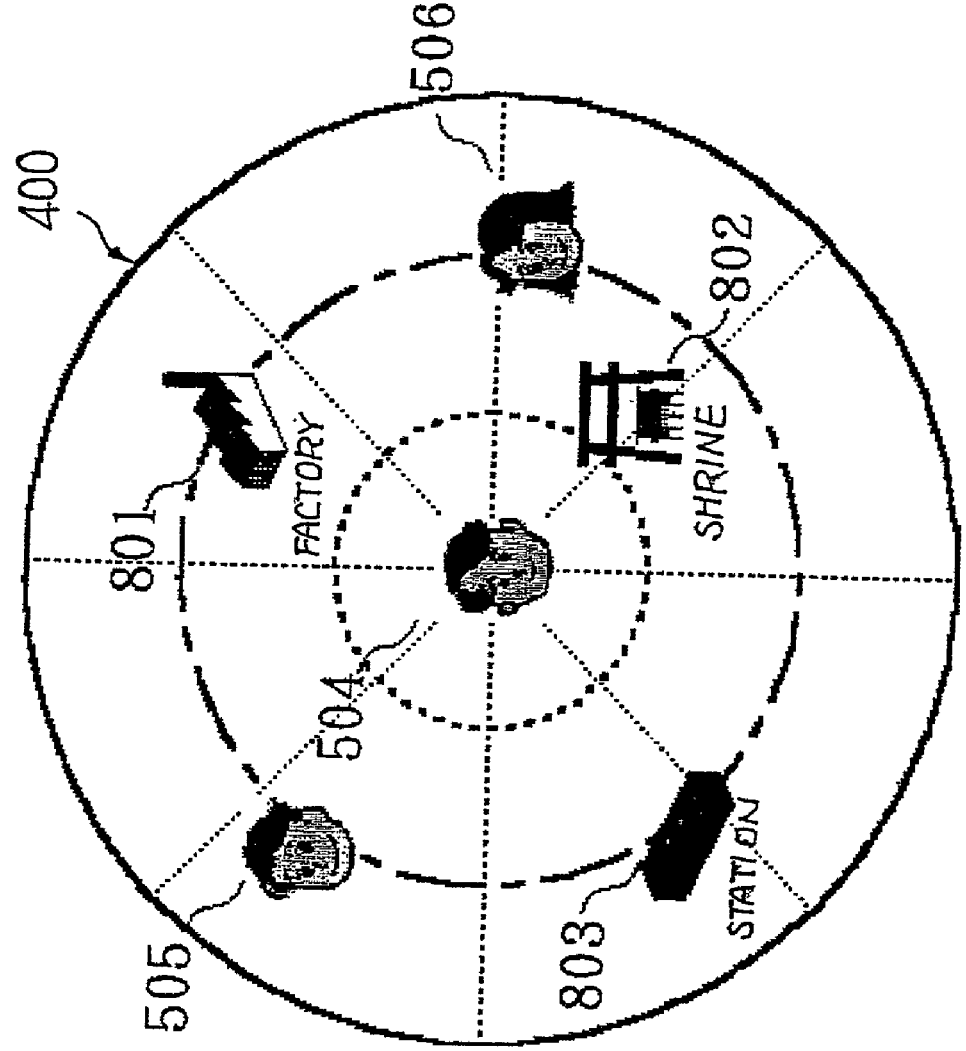
FIG. 8 is a view showing visual images produced on a display panel of yet another mobile station.

FIG. 8 illustrates visual images 801, 802 and 803 together with the visual images 400, 504, 505 and 506. The visual images 400, 504, 505 and 506 are same as those on the display panel shown in FIG. 5. The visual images 801, 802 and 803 are indicative of a factory, a shrine and a station. If another landmark and/or huge buildings are near the owner user, visual images of the buildings are produced within the concentric circles 400. In this instance, the factory is the north-northeast of the owner user 504, the shrine 802 is the southeast of the owner user 504, and the station is southwest of the owner user 504. The graphical symbols 801, 802 and 803 may be replaced with letters corresponding to the alphabetical letters "FACTORY", "SHRINE" and "STATION".

Sixth Example

Figure 9:
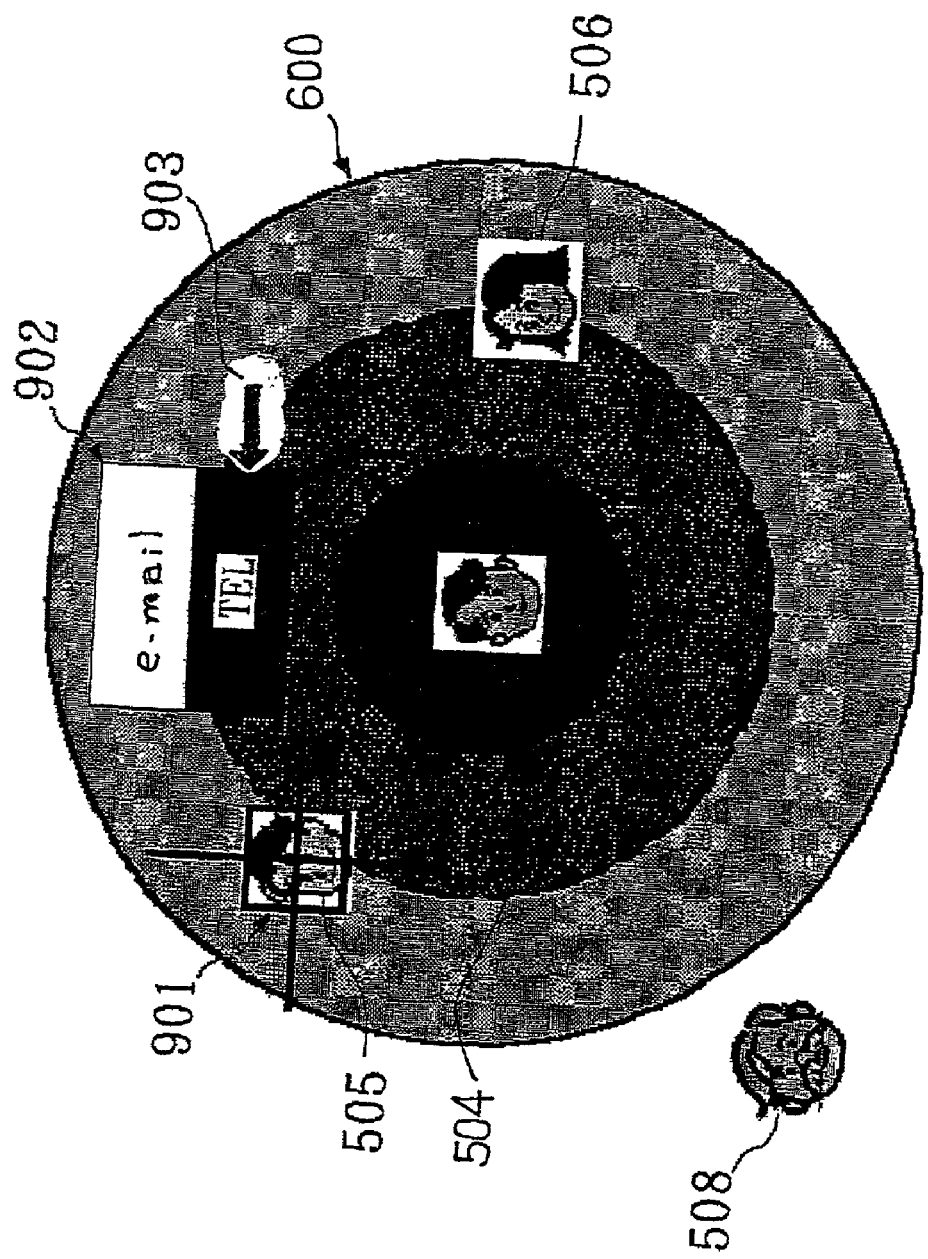
FIG. 9 is a view showing visual images produced on a display panel of still another mobile station.

FIG. 9 shows visual images 901, 902 and 903 together with the visual images 504, 505, 506, 508 and 600. The visual images 504, 505, 506, 508 and 600 are same as those on the display panel shown in FIG. 6. The visual images 901, 902 and 903 are a cursor, a select box and another cursor. When the owner user 504 wants to communicate with another user displayed on the panel, the owner user 504 moves the cursor 901 to the face-photograph 505, and makes his option. The mobile station produces the select box 902 and another cursor 903. The owner user 504 moves the cursor 903 to one of the options "e-mail" and "TEL" in the select box 902, and makes his option. Then, a communication channel is established between the owner user 504 and the user 505, and the owner user 504 talks with him or sends a message to him. In this instance, the owner user 504 selects the option "TEL" so as to talk with the user 505 through the mobile telephone. Another option such as, for example, a short message service may be further incorporated in the select box 902.

Although the first to sixth examples have been described with reference to FIGS. 4 to 9, those examples do not set any limit to the technical scope of the present invention. The owner user may not occupy the center of the concentric circles.

In the examples, the concentric circles are linked with the stationary compass 401 regardless of the moving direction of the owner user. In a mobile station equipped with a geomagnetic sensor, the mobile station rotates the visual images on the display panel when the owner user changes the moving direction of the mobile station. In this instance, the upward direction in the display panel may be always aligned with the moving direction of the mobile station.

The information service center 100 may select pieces of private information from the file of mobile stations permitting to access 203 in accordance with the conditions given by the owner user. The owner user may request the information service center 100 to select other mobile stations within the area 5 kilometers apart from the owner user or the area 10 kilometers apart from the owner user.

A mobile station may selectively reproduce the visual images on the display panel. When a user is busy or at work, the user does not want to be disturbed. For this reason, the mobile station ignores the pieces of private information of the busy user or user at work, and does not produce any visual image for busy users and users at work. This feature would be preferable for the owner user, because the owner user easily acquires the private information from the simple arrangement of the visual images.

Another mobile station notifies the owner user of other users through the display panel or tones on the condition that the other users are close to the owner user.

Determination of Current Position

Description is hereinbelow made on how the private information supplying system locates the mobile stations with reference to FIGS. 10 and 11.

First Example

Figure 10:
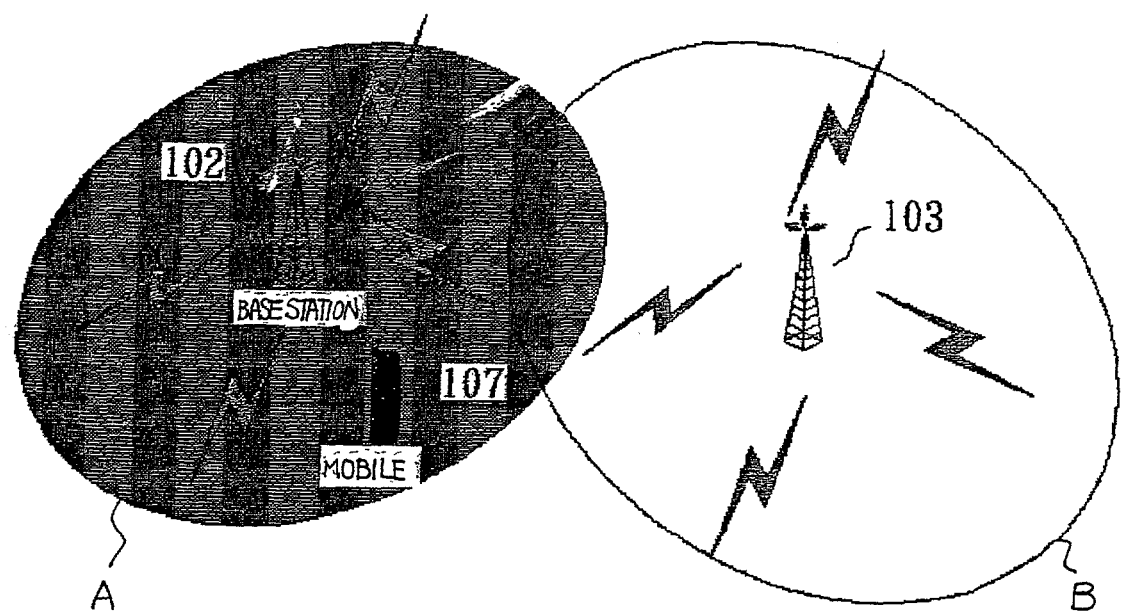
FIG. 10 is a schematic view showing a method for locating mobile stations.

FIG. 10 illustrates a method for locating a mobile station. The private information supplying system has plural base stations assigned areas as described in conjunction with FIG. 1. The base station 102 is assigned the area A, and the area B is assigned to the base station 103. The information service center 100 has already known the positions of the base stations.

Mobile stations freely moves in the area and across the boundaries between the areas. A mobile station 107 is now moving in the area A, and is communicable with the base station 102. When the mobile station 107 enters the area A, the base station 102 picks up the mobile station 107. It is well known to skilled person how the base station 102 picks up the mobile station. While the mobile station 107 is moving or staying in the area A, the mobile station 107 keeps the position of the base station 102 in the data memory, and transmits the position of the base station 102 to the information service center 100 as the current position thereof together with the other sub-pieces of current private data information 201.

If the mobile station 107 moves from the area A to the area B, the mobile station 107 keeps the position of the base station B as the current position in the data memory, and transmits the current position in the form of the second piece of current private data information 201*b* to the information service center 100.

The mobile stations are assumed to be at the positions of the base stations in so far as the mobile stations are in the areas assigned to the base stations. The allocation technologies are popular to the skilled persons in the field of mobile telephone communications. Thus, the mobile stations are located without any assistance of huge positioning system such as the global positioning system.

Second Example

Figure 11:
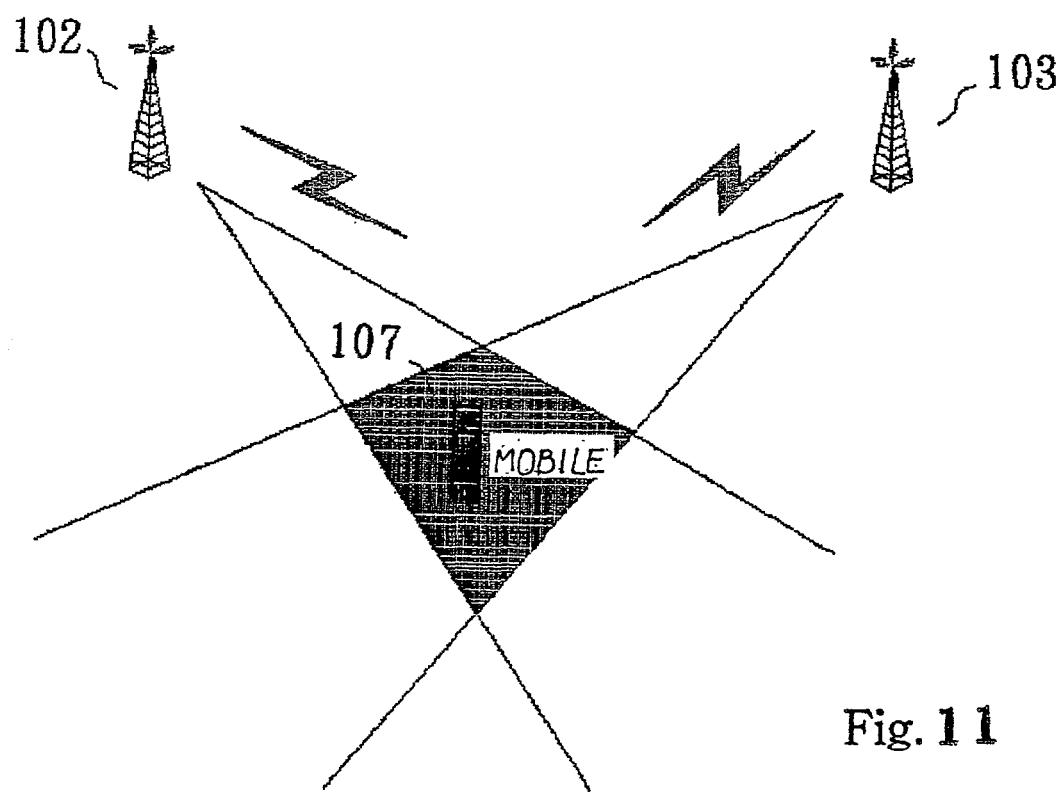
FIG. 11 is a schematic view showing another method for locating mobile stations.

FIG. 11 illustrates another method for locating mobile stations. The base stations 102/103 are equipped with directional antennas. Since the radio wave proceeds in a narrow angle range, the receive state is varied together with the directionality of the antenna. A mobile station 107 concurrently receives the radio wave from the base station 102 and another radio wave from the base station 103, and determines the direction toward the base stations 102/103. The mobile station 107 reports the receiving state and direction to one of the base stations 102 and 103. The positions of the base stations 102/103 have been already known. Then, the base station 102/103 calculates the current position on the basis of the direction toward the base station 102, direction toward the base station 103 and the basic data already known. The high-level station may determine the current position.

Even if the mobile station 107 is receiving only one radio wave from a certain base station, the mobile station 107 can determine the current position on the basis of the direction toward the certain base station, because the area assigned thereto is known.

As will be understood from the foregoing description, the private information supplying system locates the mobile stations without the complicated receiver for the global positioning system.

Second Embodiment

Figure 12:
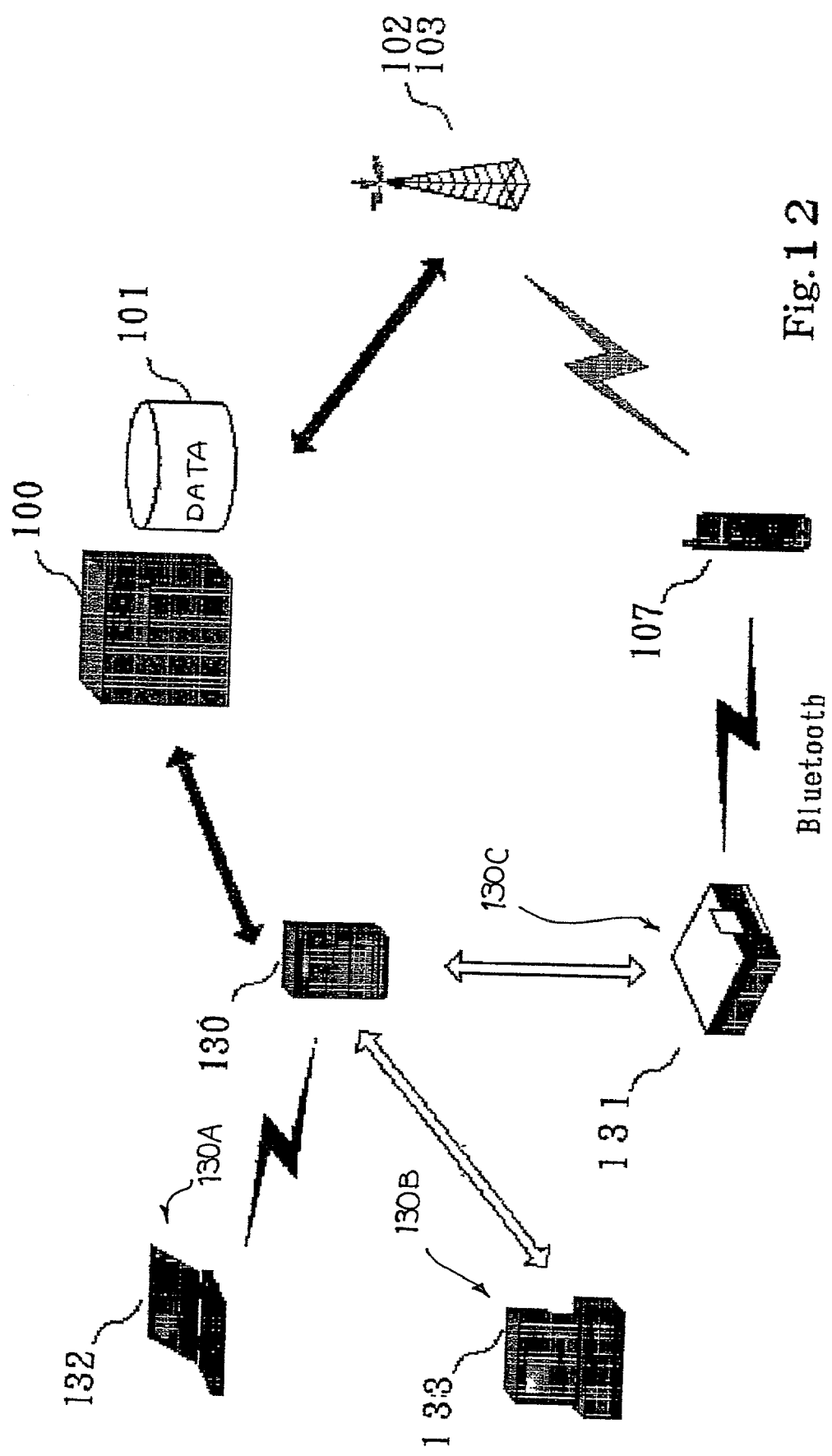
FIG. 12 is a schematic view showing the system configuration of another private information supplying system.
Figure 1:
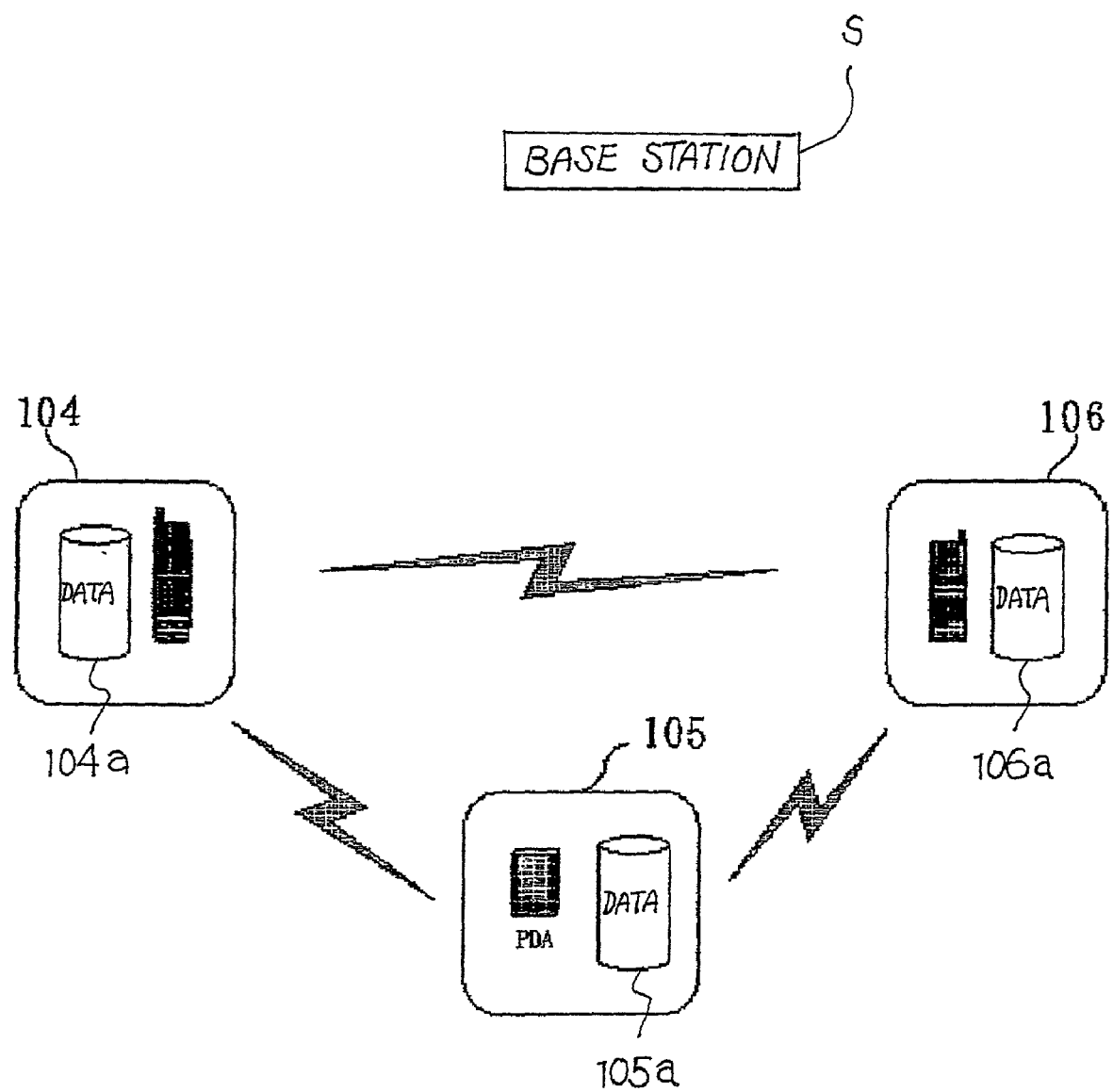

Turning to FIG. 12 of the drawings, another private information supplying system embodying the present invention largely comprises an information service center 100, base stations 102/103, a wireless LAN (Local Area Network) 130A, plural LANs 130B/130C and mobile stations. The wireless LAN 130A is connected to a server computer 130, and the LAN 130B is also connected to the server computer 130. The wireless LAN 130A and LANs 130B/130C are installed in buildings, telephone booths and stores such as, for example, department stores and convenience stores. The LAN 130C is installed in a store 131, and has a radio transmitter/receiver designed for the Bluetooth. The LAN 130C is also connected to the server computer 130, and the server computer 130 in turn is connected to the information service center 100 as shown. In this instance, a notebook-sized personal computer 132 and the desktop personal computer form a part of the wireless LAN 130A and the LAN 130B, respectively, and a mobile telephone 107 is in the area communicable with the Bluetooth receiver/transmitter of the LAN 130C. The notebook-sized personal computer 132, the desktop personal computer 133 and the mobile telephones 107 are the mobile stations, and the LANs 130A/130B/130C serve as local base stations.

The locations of the buildings, telephone booths and stores are known. While the mobile stations are communicating with the base stations 102/103, the current positions are decided as similar to those described in conjunction with FIG. 10 or 11. When the notebook-sized personal computer 132 and/or the desktop personal computer 133 start to communicate with the wireless LAN 130A and/or the LAN 130B, the LANs 130A/130B report the communication with the notebook-sized personal computer 132 and the desktop personal computer 133 through the server computer 130 to the information service center 100, and the information service center 100 determines that the mobile stations 132/133 are at the positions of the buildings, telephone booths and/or stores where the LANs 130A/130B/130C are installed. Similarly, when the mobile telephone 107 starts to communicate with the Bluetooth radio transmitter/receiver, the LAN 130C reports the communication with the mobile telephone 107 through the server computer 130 to the information service center 100, and the information service center locates the mobile telephone 107 at the store 131. The information service center 100 accumulates pieces of current positional data information exactly determined in the data storage facility 101 together with the pieces of current positional data information received from the base stations 102/103.

The areas of the LANs 130A/130B/130C are narrower than the areas assigned to the base stations 102/103 so that the current positions of the mobile stations 107/132/133 are more exact than the current positions determined through the method described with reference to FIGS. 10 and 11.

When a mobile station requests the information service center 100 to transmit pieces of private information, the information service center 100 checks the file of mobile stations permitting to access 203 to see whether or not the users have already permitted the owner user to acquire their pieces of private information. If the other users have already permitted, the information service center transmits the pieces of private information to the owner user.

As will be understood, the private information supplying system does not require any assistance of the global positioning system, and the mobile stations 107/132/133 are simpler than those of the prior art positioning system.

Third Embodiment

FIG. 13 illustrates yet another private information supplying system embodying the present invention. The private information supplying system is overlapped with a PHS (Personal Handyphone System). Handyphones 104/106 form the PHS together with base stations S, and have a transceiver mode. A personal digital assistant 105 also have the transceiver mode. The handyphones 104/106 and the personal digital assistant 105 serve as mobile stations. The handyphones 104/106 and the personal digital assistant 105 are directly communicable with one another in the transceiver mode.

The handyphones 104/106 and the personal digital assistant 105 have already stored pieces of current private data information corresponding to the piece of current private data information 201 in the data memory 104a/105a/106a. The handyphones 104/106 and the personal digital assistant 105 are assumed to be at the positions of the base stations S.

When one of the mobile stations 104/105/106 requests another mobile station to transmit the piece of private data information thereto in the transceiver mode, another mobile station directly transmits the piece of current private data information to the mobile station 104/105/106, and the mobile station 104/105/106 produces visual images representative of the piece of current private data information on a display panel.

The personal information supplying system implementing the third embodiment also does not require any assistance of the global positioning system, and the mobile stations are simpler than those of the prior art positioning system.

As will be appreciated from the foregoing description, the personal information supplying system according to the present invention is established in the mobile telephone/personal handyphone network, and the mobile stations are assumed to be at the positions determined through the communications with the base/local base stations. The private information supplying system does not require any assistance of a huge positioning system such as the global positioning system, and the mobile stations are simpler than those of the prior art positioning system. Thus, the private information supplying system is more economical than the prior art positioning system.

Moreover, the current position is not so exact as the current position determined through the global positioning system. The private information supplying system according to the present invention guards the privacy of users.

The method for displaying private information teaches a position determined through the communication with the base/local base stations instead of the pinpoints where the users are. Thus, the private information supplying system according to the present invention does not disturb the privacy of users.

The method for positioning users determines the current position through the communication with the base/local base stations. The method does not require any assistance of the global positioning system. Thus, the method for positioning users according to the present invention makes the system simple and economical.

Although particular embodiments of the present invention have been shown and described, it will be apparent to those skilled in the art that various changes and modifications may be made without departing from the spirit and scope of the present invention.

In the second embodiment, the mobile stations 107/132/133 are assumed to be at the positions of the base stations 102/103 or the positions of the LANs 130A/130B/130C. However, the mobile stations may be assumed to be at the positions of the LANs at all times.

The current positions of mobile stations may be determined on the basis of the intensity of the transmitting power.

The transceiver mode may be added to mobile telephones. The mobile telephones may form parts of the personal information supplying system implementing the third embodiment.

The mobile stations in the third embodiment may produce the visual images shown in one of FIGS. 4 to 9 through the data processing carried out by itself.

Any piece of current private data information may not be required for the mobile stations in the third embodiment. The mobile stations are communicable with one another in the transceiver mode in so far as they are within a narrow area. When a user instructs the mobile station to see whether or not a certain mobile station is within the narrow area, the mobile station calls the other mobile station in the transceiver mode. When the mobile stations are communicable in the transceiver mode, the mobile station reports the user that the other mobile station is near through visual image or tones.

The private records may be stored in the mobile stations. Otherwise, the private records may be shared between the mobile stations and the information service center. For example, the lists of discriminative codes may be stored in the mobile stations. In this instance, the other parts of the private records are accumulated in the information service center.

ID codes assigned to the mobile stations, e-mail addresses or user's names may be used as the discriminative codes. These kinds of discriminative codes may be combined for the private information supplying system.

The permission may be limited to a certain time zone. The pieces of relative positional data information may be determined by the mobile stations. In this instance, the information service center transmits the pieces of current private data information of other users to the mobile station.

The mobile telephone, personal handyphones, personal digital assistants, notebook-sized/desktop personal computers do not set a limit to the mobile stations incorporated in the private information supplying system. Any kind of information processing device is available in so far as it has the communication capability.

The hardware of the private information supplying system may be partially replaced with software.

What is claimed is:

1. A private information supplying system for supplying a piece of private information of a first user to a second user, comprising:
   plural base stations assigned areas, respectively;
   plural mobile stations movable in said areas and outside of said areas, and having respective display panels for producing visual images representative of at least first sub-pieces of private information each indicative of a relative position between said first user and said second user, each of said plural mobile stations communicating with one of said plural base stations while each of said plural mobile stations is moving in the area assigned to one of said plural base stations; and
   an information service center communicable through said plural base stations with said plural mobile stations, producing each of said first sub-pieces of private information of said first user on the basis of current positions determined through communication between the mobile stations of said first user and said second user and the base stations communicating therewith when said second user requests said information service center to supply each of said first sub-pieces of private information, and transmitting said first sub-pieces of private information through the associated base station to said mobile station of said second user if said first user permits said second user to access said first sub-pieces of private information, wherein the first user permits said second user to access said first sub-pieces of private information when said mobile station of said first user is listed in a file of a private record of said mobile station of said second user.

2. The private information supplying system as set forth in claim 1, wherein in which said information service center has private records assigned to said plural mobile stations, respectively, and each of said private records has a file of mobile stations permitting associated one of said plural mobile stations to access the pieces of first private information respectively including the first sub-pieces of private information, and said information service center checks the private record of the mobile station used by said second user to see whether or not said first user has already permitted said second user to access the piece of private information owned by said first user before transmitting each of said first sub-pieces of private information to said mobile station of said second user.

3. The private information supplying system as set forth in claim 2, in which said plural mobile stations are respectively assigned discriminative codes so that the discriminative codes of said mobile stations are stored in said file.

4. The private information supplying system as set forth in claim 2, in which each of said private records further has a data block where conditions of the access are stored.

5. The private information supplying system as set forth in claim 4, in which said information service center asks said mobile station of said first user whether or not said first user presently permits said second user to access said piece of private information when said conditions are negative.

6. The private information supplying system as set forth in claim 1, in which the mobile stations in said areas are assumed to be at the base stations presently communicable with said mobile stations, and the positions of said base stations are reported from said mobile stations to said information service center as said current positions.

7. The private information supplying system as set forth in claim 6, in which said base stations further report current status of the users to said information service center together with said current positions, and said information service center further produces second sub-pieces of private information representative of said current status of said users so as to transmit the second sub-piece of private information representative of said current status of said first user to said second user together with said each of said first sub-pieces of private information.

8. The private information supplying system as set forth in claim 7, in which said current status selectively represents at least idling state, busy state, working state and sleeping state.

9. The private information supplying system as set forth in claim 1, in which said information service center determines a distance between said current position of said first user and said current position of said second user and a compass bearing of said first user with respect to said second user, and stores said distance and said compass bearing in each of said first pieces of private information.

10. The private information supplying system as set forth in claim 9, in which said base stations further report current status of the users to said information service center together with said current positions, and said information service center further produces second sub-pieces of private information representative of said current status of said users so as to transmit the second sub-piece of private information representative of said current status of said first user to said second user together with each of said first sub-pieces of private information.

11. The private information supplying system as set forth in claim 10, in which said current status selectively represents at least idling state, busy state, working state and sleeping state.

12. The private information supplying system as set forth in claim 1, in which said plural base stations communicate with the mobile stations in said areas through radio channels.

13. The private information supplying system as set forth in claim 12, in which said plural base stations have directional antennas, respectively, and each of said current positions is determined on the basis of the directions of the radio channels of at least two of said plural base stations.

14. The private information supplying system as set forth in claim 1, in which at least one local area network serves as one of said plural base stations, and is connected through a server computer to said information service center.

15. The private information supplying system as set forth in claim 14, in which said at least one local area network is communicable with at least one of said plural mobile stations through a wireless channel.

16. The private information supplying system as set forth in claim 14, in which said at least one local area network has a transmitter and receiver designed in accordance with a specification of Bluetooth.

17. The private information supplying system as set forth in claim 1, in which said first user and said second user are communicable with one another through said mobile stations and said base stations.

18. The private information supplying system as set forth in claim 17, in which at least one of telephone network and e-mail network is used for the communication between said first user and said second user.

19. A private information supplying system for supplying a piece of private information of a first user to a second user, comprising:

plural base stations assigned areas, respectively;

plural mobile stations movable in said areas and outside of said areas, and having respective display panels for producing visual images representative of at least first sub-pieces of private information each indicative of a position of said first user, each of said plural mobile stations communicating with one of said plural base stations while said each of said plural mobile stations is moving in the area assigned to said one of said plural base stations;

an information producing means associated with said plural mobile stations, and producing each of said first sub-pieces of private information of said first user on the basis of a current position determined through communication between the mobile station of said first user and the base station communicating therewith when said second user requests said information producing means to produce said each of said first sub-piece of private information; and an information transmitting and receiving means associated with said plural mobile stations and said information producing means, and supplying said each of said first sub-pieces of private information to one of said mobile stations of said second user if said first user permits said second user to access said each of said first sub-pieces of private information, wherein the first user permits said second user to access each of said first sub-pieces of private information by the first user providing a private record assigned to said first user and stored at the information service center, the private record having a file of mobile stations permitting associated one of said plural mobile stations to access the pieces of first private information respectively including the first sub-pieces of private information.

20. The private information supplying system as set forth in claim 19, in which said information transmitting and receiving means are partially incorporated in an information service center connected to said plural base stations and partially in said plural mobile stations.

21. The private information supplying system as set forth in claim 19, in which said information transmitting and receiving means are incorporated in said plural mobile stations.

* * * * *